United States Patent [19]

Cencula et al.

[11] Patent Number: 5,303,880
[45] Date of Patent: Apr. 19, 1994

[54] AIRCRAFT ENGINE PIN MOUNT

[75] Inventors: James E. Cencula, Middletown; Donald L. Bellia; Hahn M. Spofford, both of West Chester, all of Ohio

[73] Assignee: General Electric Company, Cincinnati, Ohio

[21] Appl. No.: 967,355

[22] Filed: Oct. 28, 1992

[51] Int. Cl.[5] .............................................. B64D 27/26
[52] U.S. Cl. ....................................... 244/54; 248/554
[58] Field of Search ................... 244/54; 248/554, 555, 248/556, 557; 60/39.31

[56] References Cited

U.S. PATENT DOCUMENTS

| | | | |
|---|---|---|---|
| 4,603,822 | 8/1986 | Chee | 244/54 |
| 4,717,094 | 1/1988 | Chee | 244/54 |
| 4,725,019 | 2/1988 | White | 244/54 |
| 4,943,013 | 7/1990 | Kapala et al. | 244/54 |

Primary Examiner—Michael S. Huppert
Assistant Examiner—Anne E. Bidwell
Attorney, Agent, or Firm—Jerome C. Squillaro; Nathan D. Herkamp

[57] ABSTRACT

An aircraft engine mounting assembly using a clevis type joint to connect a link is provided with a mounting pin assembly disposed in an aperture of the link having inexpensive and easily replaceable concentric inner and outer non-rotational bushings surrounding a conventional pin and corresponding oppositely disposed sets of inner flat contact surfaces on the outer surface of inner bushing and outer flat contact surfaces on the inner surface of the outer bushing which provide reduced contact stresses between the pin and the aperture as compared to conventional assemblies. The contact surfaces are in general sliding engagement in the longitudinal direction and are provided with clearances between the inner and outer bushings in the longitudinal and transverse directions to allow for thermal growth of the engine.

9 Claims, 4 Drawing Sheets

AIRCRAFT ENGINE PIN MOUNT

TECHNICAL FIELD

The present invention relates generally to aircraft mounted gas turbine engines, and, more specifically, to a mounting pin assembly used for mounting an engine to an aircraft.

BACKGROUND ART

A gas turbine engine is typically mounted below an aircraft wing or within an aircraft tail section to a pylon. The engine is typically mounted at both its forward end and at its aft end for transmitting loads to the pylon. The loads typically include vertical loads such as the weight of the engine itself, axial loads due to the thrust generated by the engine, side loads such as wind buffeting, and roll loads or moments due to rotary operation of the engine. The mounts must also accommodate both axial and radial thermal expansion and contraction of the engine relative to the supporting pylon.

In one type of aft mount, a support bracket is fixedly joined to the pylon by two spaced pins in a plane extending perpendicularly through the centerline of the engine, and to a turbine frame in the engine by a third pin in an L-shaped configuration. Spaced circumferentially from the bracket is a simple link which is pivotally joined to both the pylon and the frame. The bracket is provided so that the aft mount assembly can accommodate in-plane loads, i.e. those in a single vertical axial plane extending perpendicularly to the engine longitudinal centerline axis, including the vertical loads, side or horizontal loads, and roll loads or moments, and, therefore, the bracket does not rotate. By rigidly joining the bracket to the pylon at two points and to the frame at a single point, the bracket can transfer in-plane loads from the frame to the pylon through tension, compression, and bending of the bracket.

The link, however, by being pivotally joined between the pylon and frame can only transfer tensile and compressive loads along its longitudinal axis between its mounting pins. The link is otherwise free to rotate in-plane relative to the pylon and frame. Allowing the link to rotate is required for accommodating radial expansion and contraction of the frame without introducing additional reaction stresses which would otherwise occur if the link connection to the frame were prevented from moving relative to the bracket connection to the frame during thermal expansion and contraction.

This exemplary aft mount may further include a failsafe bracket disposed between the support bracket and link which is normally not a load bearing member, but is provided solely for carrying loads upon failure of either the link or support bracket. The failsafe bracket is fixedly joined at its proximal end to the pylon and includes an aperture at its distal end through which is positioned a pin fixedly joined to the frame. A predetermined clearance is provided between the pin and the aperture so that during normal operation of the mount, no loads are transferred from the frame to the pylon through the failsafe bracket. However, upon failure of either the link or the support bracket, the pin will contact the failsafe bracket at its aperture for transferring loads through the failsafe bracket from the frame to the pylon which would otherwise be transmitted through the failed member. The failsafe bracket is fixedly joined to the pylon and does not rotate to ensure that it also can transfer all in-plane loads including vertical and horizontal loads. This is required because the link is allowed to pivot and is, therefore, unable to transfer all in-plane loads if the support bracket were to fail.

This exemplary failsafe bracket is relatively large and heavy for accommodating the required in-plane loads therethrough, and also affects the ability to obtain a compact aft mount which must typically fit within a limited envelope between the engine and the pylon without adversely affecting the airflow over the outer surfaces of the engine nacelle and the pylon fairing.

Furthermore, in order to fit the aft mount in this limited envelope, the distance between the two pins of the support bracket joined to the pylon is typically shorter than the distance between the pin of the support bracket joined to the frame and the middle pin, in the corner of the L, of the support bracket on the pylon. Accordingly, a transverse (with respect to the axis of the pin) load acting on the pin at the frame bends the support bracket about the middle pin and results in an amplified reaction couple shear load acting on the middle pin which must be suitably accommodated, by providing a larger diameter pin, for example, to ensure acceptable life.

An improved engine mount was developed to overcome these deficiencies and is the subject of a U.S. patent application No. 07/821,376, entitled "Aircraft Engine Mount", by L. Seelen et al., filed on Jan. 16, 1992, and is assigned to the present assignee. This engine mount provided an improved simpler failsafe apparatus and is lighter in weight than conventional engine mounts. This engine mount is also more compact and effective for reducing reaction couple shear pin loads.

This aircraft engine mount provides a frame fixedly joined in a gas turbine engine, and a platform fixedly joined to an aircraft pylon. A first link is pivotally joined to the frame and the platform at first and second joints, respectively. The first link is additionally joined to the platform at a third joint having a clevis and pin which allows longitudinal movement between the first link and the platform at the third joint while preventing rotation of the first link. A second link is circumferentially spaced from the first link and is pivotally joined to the frame and platform at fourth and fifth joints, respectively, and is additionally joined to the platform at a sixth joint by a clevis and pin for allowing limited rotation of the second link during normal operation while preventing rotation of the second link upon a failure of the first link to carry load.

However, the clevis and pin joint, which allows limited translational and rotational movement, is subject to contact stresses between the bearing surfaces of the clevis and pin joint because of the very high side loads they are subject to during rotational movement of the pin within the clevis. Therefore the bearing surfaces are subject to significant deterioration such as coining or distortion of the contact surface. This can rapidly increase the relative motion of the engine to the pylon throughout the aircraft life. This translational joint that prevents engine rotation needs a bearing surface that exhibits low wear and long life.

DISCLOSURE OF INVENTION

An aircraft engine mounting assembly using a clevis type joint to connect a link is provided with a mounting pin assembly disposed in an aperture of the link wherein the pin assembly includes concentric inner and outer non-rotational bushings with a conventional pin disposed within the inner bushing. The pin assembly further includes corresponding oppositely disposed sets of inner flat contact surfaces on the outer surface of inner bushing and outer flat contact surfaces on the inner surface of the outer bushing. The outer and inner contact surfaces are in general sliding engagement in the longitudinal direction (the two sets are disposed 180° apart).

A first set of clearances between the inner and outer bushings in the longitudinal and transverse directions are provided to allow for thermal growth of the engine. A second set of clearances provide for the use of one link of the engine mount to operate as a fail safe or backup link.

ADVANTAGES

The present invention provides inner and outer bushings to surround an aircraft engine mounting pin disposed in corresponding apertures of a link and flat bearing surfaces between the inner and outer bushing which provides reduced contact stresses between the pin and the aperture as compared to conventional aircraft engine mounting assemblies. This significantly reduces the amount of deterioration of the pins and links used to mount aircraft gas turbine engines. In addition to the improved wear capability of the present invention, any wear that does occur may be generally confined to the bushings, parts that are less expensive and more easily replaced than the pin and link which would have to be replaced in the prior art designs. The ease of replacement is further enhanced because the design allows for a press fit of the bushings during installation.

BRIEF DESCRIPTION OF THE DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

DETAILED DESCRIPTION OF THE INVENTION

Figure 1:
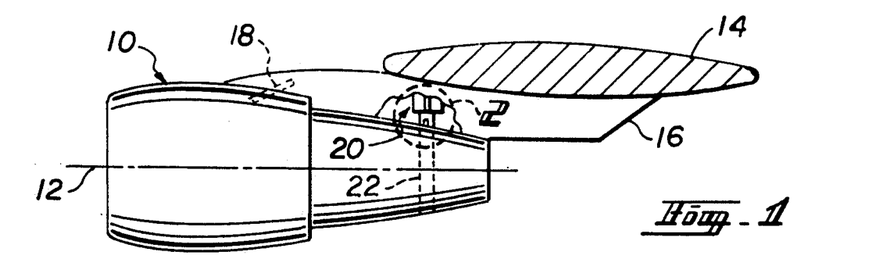
FIG. 1 is a side view of a gas turbine engine mounted to a pylon below an aircraft wing by an aft engine mount in accordance with one exemplary embodiment of the present invention.

Illustrated in FIG. 1 is an exemplary high bypass gas turbine engine 10 having a longitudinal or axial centerline axis 12 mounted below an aircraft wing 14. The wing 14 includes a pylon 16, and the engine 10 is mounted to the pylon at a conventional forward mount 18, shown in dashed line, and an aft mount 20 spaced axially downstream from the forward mount 18.

Figures 2, 2A:
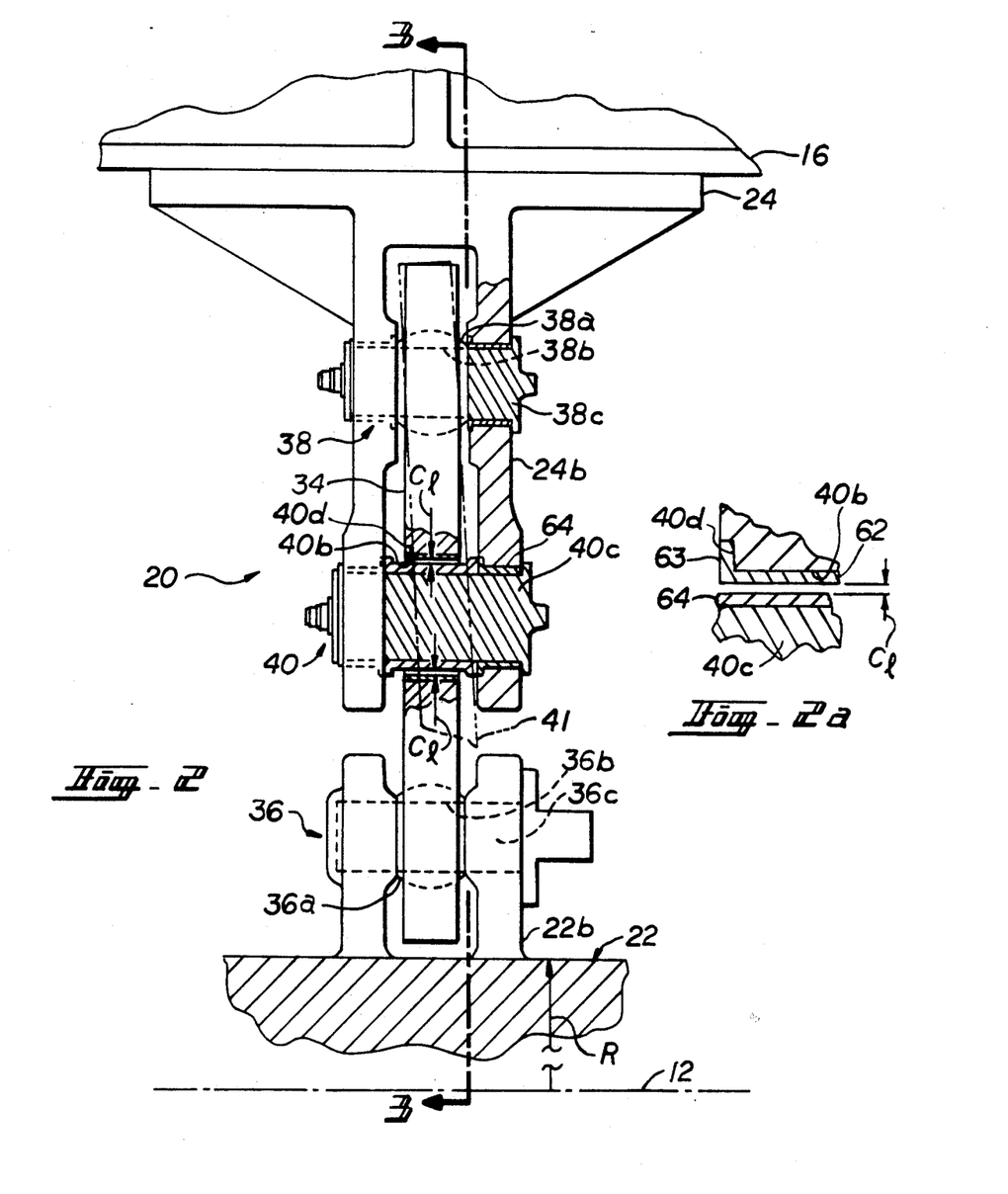
FIG. 2 is an enlarged side view of the aft engine mount illustrated in FIG. 1 shown within the dashed circle labeled 2.
FIG. 2a is an enlarged fragmentary view illustrating the inner and outer bushings and the pin of the portion of the aft engine mount illustrated in FIG. 2.
Figure 3:
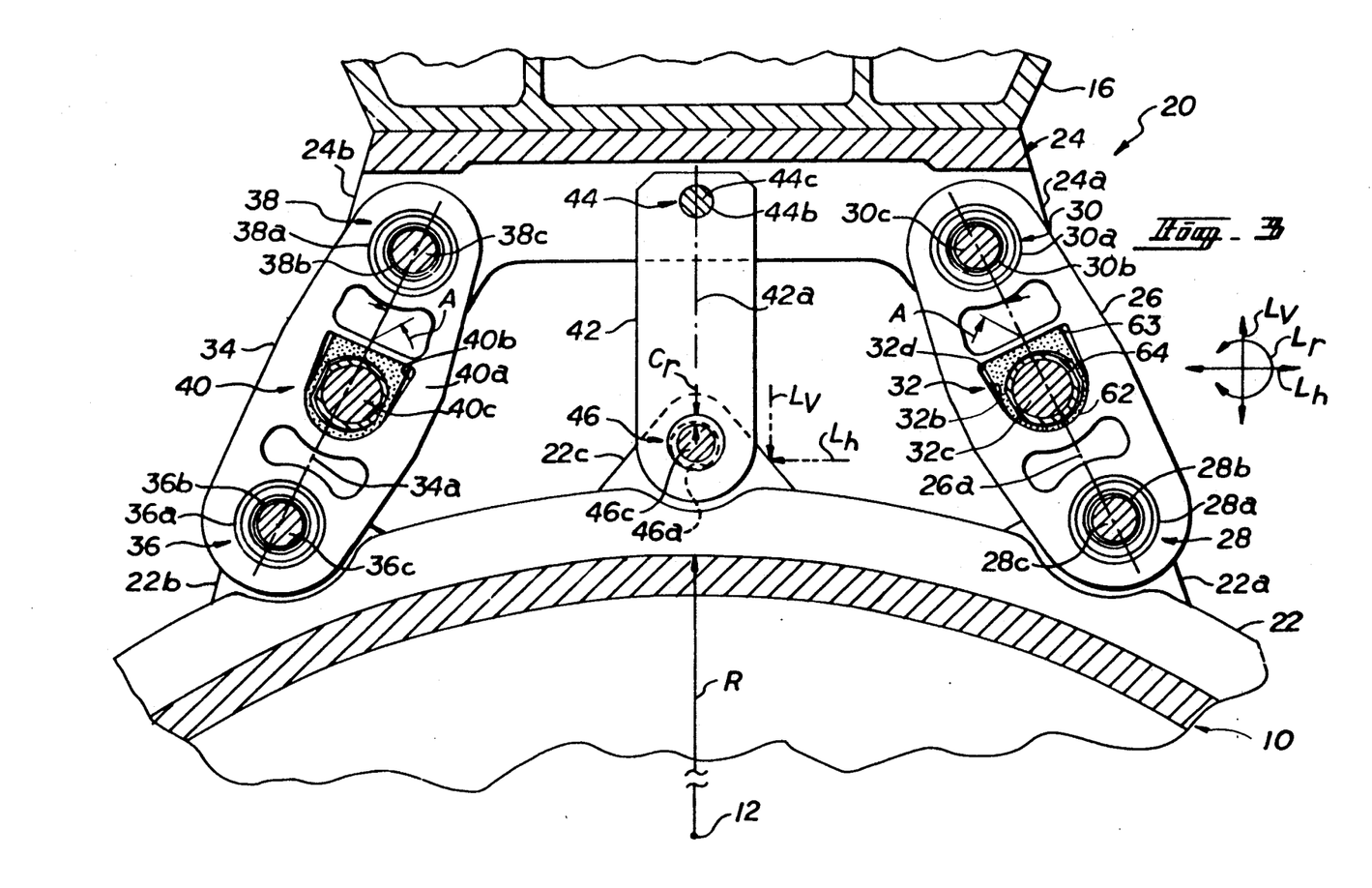
FIG. 3 is a partly sectional, elevation, radial-plane view of the aft mount illustrated in FIG. 2 taken along a vertical plane labeled 3—3 disposed perpendicularly to the engine centerline axis.
Figure 4:
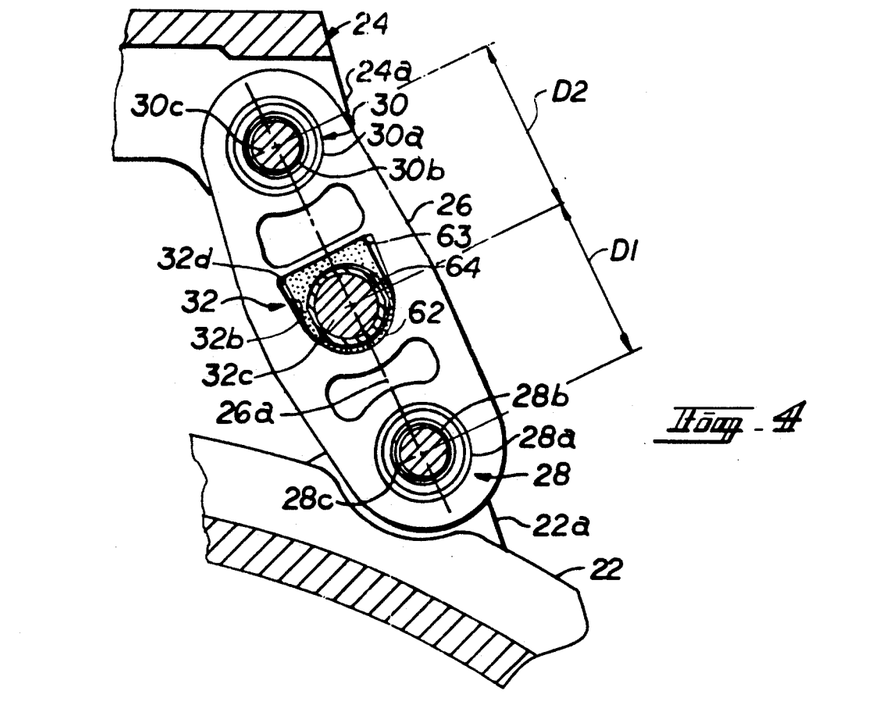
FIG. 4 is an enlarged elevation view of a first link used in the aft mount illustrated in FIG. 3.

The aft mount 20 in accordance with a preferred and exemplary embodiment of the present invention is more particularly illustrated in FIGS. 2, 3, and 4. The aft mount 20 is fixedly joined to a conventional annular turbine frame 22 of the engine 10. A generally rectangular-based platform 24 is conventionally fixedly joined to the pylon 16 by bolts (not shown).

Referring to FIG. 3, a first longitudinally extending link 26 is pivotally joined to the frame 22 at a first spherical joint 28 at one end thereof, and is pivotally joined to the platform at a second spherical joint 30 at an opposite end thereof. The first link 26 is additionally joined to the platform 24 at a third clevis pin joint 32 disposed between the first and second joints 28 and 30.

A second link 34 is spaced circumferentially from the first link 26 and is pivotally joined to the frame 22 at a fourth spherical joint 36 at one end thereof, and pivotally joined to the platform 24 at a fifth spherical joint 38 at an opposite end thereof. The second link 34 is additionally joined to the platform 24 at a sixth clevis pin joint 40 disposed between the fourth and fifth joints 36 and 38. In the exemplary embodiment illustrated in FIG. 3, the first, second, and third joints 28, 30, and 32 are generally linearly aligned along a first longitudinal axis 26a of the first link 26 extending through the first and second joints 28 and 30. The first link 26 is inclined from a tangent to the frame 22, in the vertical or axial plane illustrated, at an angle A, of about 40°. Similarly, the fourth, fifth, and sixth joints 36, 38, and 40 of the second link 34 are also generally colinearly aligned along a second longitudinal axis 34a of the second link 34 extending through the fourth and fifth joints 36 and 38. The second link 34 is inclined oppositely to the first link 26 from a tangent to the annular frame 22 also at the angle A of about 40°. In this way, the first and second links 26 and 34 straddle the top of the frame 22 generally equally about the vertical centerline axis of the frame 22 for supporting the frame 22 vertically as well as horizontally as described in more detail below.

Each of the first, second, fourth, and fifth joints 28, 30, 36, and 38 preferably includes a conventional spherical bearing 28a, 30a, 36a, and 38a conventionally joined to respective ones of the first and second links 26 and 34, with each spherical bearing including a respective central aperture 28b, 30b, 36b, and 38b. Respective first, second, fourth, and fifth pins or bolts 28c, 30c, 36c, and 38c extend through the respective spherical bearings and are conventionally fixedly joined to respective ones of the platform 24 and the frame 22.

In the exemplary embodiment illustrated in FIGS. 2 and 3, the platform 24 preferably includes circumferentially spaced apart, conventional first and second U-shaped clevises 24a and 24b, respectively, and the frame 22 similarly includes circumferentially spaced apart, conventional first and second U-shaped clevises 22a and 22b, respectively. As shown more particularly in FIG. 2, the second link 34 is disposed in the second clevises 22b and 24b of the frame 22 and the platform 24, and is joined to the frame second clevis 22b at the fourth joint 36, and to the platform second clevis 24b at both the fifth and sixth joints 38 and 40.

The first link 26 illustrated in FIG. 3 is substantially identical in side view to that of the second link 34 illustrated in FIG. 2, and is similarly disposed in the first clevises 22a and 24a of the frame 22 and the platform 24, and is joined to the frame first clevis 22a at the first joint 28, and joined to the platform second clevis 24a at both the second and third joints 30 and 32.

The third clevis pin joint 32 and the sixth clevis pin joint 40 illustrate features of the present invention and are similar in design but have different clearances suitable to the task of their respective links. These features are illustrated by the third clevis pin joint 32 which includes a pin assembly having a non-rotational generally annular outer bushing 62 disposed within a third aperture 32b in the form of a cylindrical hole in the first link 26. A third bolt or pin 32c is fixedly joined to the platform through the first clevis 24a, which pin 32c extends between the platform 24 and the first link 26 and through the third aperture 32b.

Figure 3A:
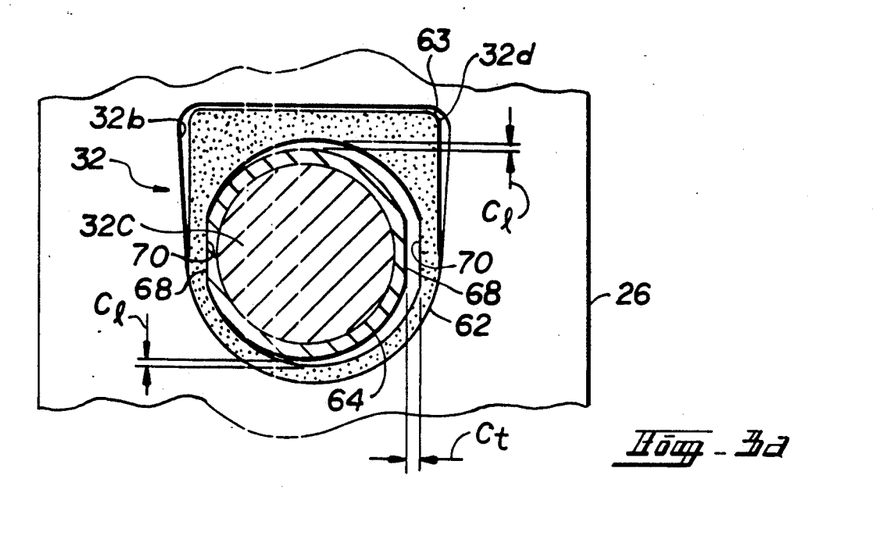
FIG. 3a is an enlarged view of a clevis and pin type joint and pin assembly and used to connect a link to an aft engine mount as illustrated in FIG. 3 in accordance with the preferred embodiment of the present invention.

Referring to FIGS. 3 and 3a, an inner bushing 64 is generally concentrically disposed within the outer bushing 62. An unsymmetrical, with respect to the circular cross-section of aperture 32b, anti-rotation head 63 on a first end of the outer bushing 62 is designed to be received within a generally corresponding recess 32d in a surface of the first link 26 around the third aperture 32b. The bushings are also illustrated in cross-section through the axis of pin 40c in FIGS. 2 and 2A, wherein the anti-rotation head 63, the outer bushing 62, inner bushing 64, and the pin 40c are disposed in corresponding recess 40d and aperture 40b.

Referring more particularly to FIG. 3a, two sets of corresponding oppositely disposed sets of inner flat contact surfaces 68 on the outside diameter (OD) of the inner bushing 64 and outer flat contact surfaces 70 on the inside diameter (ID) of the outer bushing 62 provide the pin assembly with wear surfaces that are substantially more durable than the aircraft engine mounting assemblies shown in the prior art. These nested inner and outer bushings 64 and 62 respectively provide a pin joint with flat contact areas that reduce bearing contact stresses. Furthermore the wear is generally confined to the bushings which are relatively inexpensive to replace are easy to install since a press fit is preferably used to help install the bushings. The outer and inner contact surfaces are in general sliding engagement in the longitudinal direction (the two sets are disposed 180° apart). The inner flat contact surfaces 68 are oppositely disposed, in a generally longitudinal direction with respect to the first link 26, on the OD of inner bushing 64. The outer flat contact surfaces 70 are disposed on the inner diameter ID of outer bushing 62 and are in sliding engagement with the set of inner flat contact surfaces 68. The inner flat contact surfaces 68 are narrower than the corresponding outer flat contact surfaces 70 for assembly purposes with respect to each of joints 32 and 40 and for an additional purpose with respect to joint 40 which is discussed susbsequently, and the OD of inner bushing 64 is smaller than the ID of outer bushing 62 so as to form a longitudinal clearance $C_l$ between the ID of outer bushing 62 and the OD of inner bushing 64. For example, the third pin 32c may have a diameter of 1 and 15/16 inches and the $C_l$ may be 0.08 inches.

The pin assembly, including the inner and outer bushings 64 and 62 respectively and clearance $C_l$ between them, is designed to allow a predetermined amount of longitudinal or generally vertical displacement of the third aperture 32b of the first link 26 upwardly and downwardly relative to the third pin 32c while preventing both transverse or generally horizontal displacement of the third aperture 32b and the first link 26 and corresponding rotation of the first link 26 in the radial plane. This may be simply accomplished by providing a relatively tight fit between the inner flat contact surfaces 68 and the outer flat contact surfaces 70 and a clearance $C_l$ between the ID of outer bushing 62 and the OD of inner bushing 64 that is as small as practical for allowing solely longitudinal sliding movement of the third aperture 32b relative to the third pin 32c. The clearance $C_l$ and the tight fit between the inner flat contact surfaces 68 and the outer flat contact surfaces 70 is also designed to accommodate axial thermal expansion and contraction of the engine 10 in addition to the thermal expansion of the links. Similarly, and referring to FIG. 5, the sixth joint 40 is designed in the same manner as the third joint 32.

Illustrated in FIG. 2 in phantom line designated 41 is the rotated position of either the first link 26 or the second link 34 due to axial thermal expansion of the engine 10 between the forward mount 18 and the aft mount 20 (see FIG. 1) in an axially extending centerline plane extending along the centerline axis 12 which is disposed perpendicularly to the axial plane illustrated in FIG. 3. Since the engine 10 is heated during operation, it expands axially with the turbine frame clevises 22a and 22b being displaced axially relative to the platform clevises 24a and 24b as shown schematically in FIG. 2.

If the third and sixth apertures 32b and 40b (FIGS. 3 and 4) fit tightly around the respective third and sixth pins 32c and 40c, free rotation of the first and second links 26 and 34 in the centerline plane would be restrained, thusly inducing undesirable reaction loads and stresses in the first and second links 26 and 34. By providing the predetermined longitudinal gap $C_l$ above and below the respective third and sixth pins 32c and 40c, the third and sixth pins 32c and 40c are allowed to freely move upwardly and downwardly within the third and sixth apertures 32b and 40b thereby allowing free rotation of the first and second links 26 and 34 between the respective first and second joints 28 and 30, and fourth and fifth joints 36 and 38 in the centerline plane shown in FIG. 2. The spherical bearings 28a, 30a, 36a, and 38a allow the first and second links 26 and 34 to so rotate on the first, second, fourth, and fifth pins 28c, 30c, 36c, and 38c, respectively.

However, the first link 26 is considered an active or fulltime transverse load link since it is not allowed to rotate in the axial plane relative to the frame 22 and the platform 24 during normal operation. In this way, the first link 26 is effective for transmitting all in-plane loads in the axial plane from the frame 22 to the platform 24 including vertical loads $L_y$ and horizontal loads $L_h$, and together with the second link 34, roll loads or moments $L_r$. $L_v$, $L_h$, and $L_r$ are all illustrated schematically in FIGS. 3 and 4 to show opposite positive and negative directions of these loads. The first link 26 is effective for transmitting such loads from the frame 22 to the platform 24 either through tension or compression of the first link 26 along its longitudinal axis 26a between the first and second joints 28 and 30, or by elastic bending of the first link 26 since it is restrained from rotating by the third pin 32c which indirectly contacts the side surfaces of the third aperture 32b through inner and outer bushings 64 and 62 respectively.

Accordingly, although the first and second links 26 and 34 are unable to transmit moment loads between the frame 22 and the platform 24 in the centerline plane illustrated in FIG. 2, the first, or fulltime, link 26 together with the second link 34 is effective for transmitting all in-plane loads including moment loads in the axial plane illustrated in FIG. 3.

However, the second link 34 is not such a fulltime link but is considered a waiting link since it does not have the ability during normal operation of the mount 20 to transmit side loads or any other loads between the frame 22 and the platform 24 other than those directed parallel to its longitudinal axis 34a between the fourth and fifth joints 36 and 38 in either tension or compression in the fashion of a simple link. This is necessary for allowing unrestrained radial thermal expansion and contraction of the frame 22 without imposing additional reaction forces from the second link 34. More specifically, and as shown in FIG. 3a as applied to the sixth clevis pin joint 40, the sixth aperture 40b in the second link 34 has an outer bushing 62 with an ID that is sized predeterminedly larger than the OD of the inner bushing 64 within which is disposed the sixth clevis type pin 40c for providing a limited longitudinal clearance $C_l$ in the longitudinal direction in the axial plane. A predetermined transverse clearance $C_t$ between inner and outer flats 68 and 70 for the bushings around the sixth pin 40c is also provided. By sufficiently sizing the $C_l$ and $C_t$ of the bushings within sixth aperture 40b, both longitudinal or generally vertical and transverse or generally horizontal displacement of the sixth pin 40c is allowed in the sixth aperture 40b for allowing limited rotation of the second link 34 in the centerline and axial planes without restraint, or bending between the frame 22 and the platform 24 during normal operation.

As described above, the sixth aperture 40b has inner and outer bushings having a longitudinal clearance $C_l$ between them that is preferably sized larger than the transverse clearance $C_t$ between the flats of the bushings in the transverse direction to allow unrestrained axial expansion of the engine 10 with differential axial movement between the clevises of the frame 22 and those of the platform 24. The transverse clearance $C_t$ between the flats of the inner and outer bushings in the sixth aperture 40b is also predeterminedly sized sufficiently large enough to allow the second link 34 to rotate in the axial plane about the fourth joint 36 during normal operation without restraint for accommodating radial expansion and contraction of the turbine frame 22, which radial expansion and contraction will increase and decrease, respectively, the distance between the first joint 28 and the fourth joint 36. By contrast the third joint 32 does not employ any transverse clearances $C_t$ beyond the amount required for assembly purposes that would allow the first link 26 to rotate in a similar axial plane.

Figure 3B:
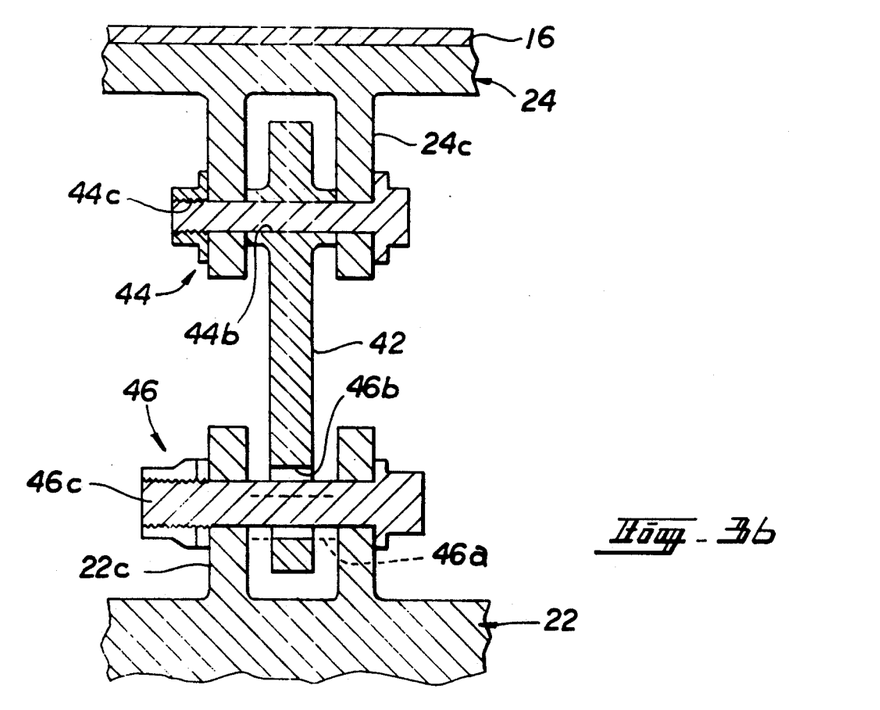
FIG. 3b is a sectional elevation view of a failsafe link used in the aft mount illustrated in FIG. 3 taken along line 3—3.

The aft mount 20, illustrated in FIG. 3b, preferably also includes a straight failsafe link 42 preferably disposed or spaced generally parallel between the straight first and second links 26 and 34 as illustrated in FIG. 3 and 3b which collectively provide a compact arrangement for the aft mount 20. The failsafe link 42 is pivotally joined to the platform 24 at a seventh joint 44 at a proximal end thereof, and pivotally joined to the frame 22 at an eighth joint 46 at an opposite distal end thereof. In the preferred embodiment, the frame 22 further includes a U-shaped third clevis 22c in which the eighth joint 46 is made, and the platform 24 includes a U-shaped pocket or clevis 24c in which the seventh joint 44 is made.

The seventh joint 44 includes a seventh aperture 44b in the proximal end of the failsafe link 42, and a seventh bolt or pin 44c extending therethrough and fixedly joined to the platform third clevis 24c. The outer diameter of the seventh pin 44c and the diameter of the seventh aperture 44b are conventionally sized, and are substantially equal, for allowing rotation of the failsafe link 42 about the seventh pin 44c. The seventh pin 44c may alternatively be disposed in a conventional bushing or spherical bearing if desired.

The eighth joint 46 preferably includes an eighth aperture 46b disposed in the distal end of the failsafe link 42, with an eighth bolt or pin 46c extending between the frame 22 and the failsafe link 42 and through the eighth aperture 46b, and fixedly joined to the frame third clevis 22c. The eighth aperture 46b is sized suitably larger than the diameter of the eighth pin 46c for allowing both predetermined, limited amounts of vertical and horizontal displacement of the eighth pin 46c in the eighth aperture 46b, and limited rotation of the failsafe link 42 in the axial plane during normal operation. In this way, the failsafe link 42 carries no load therethrough during normal operation of the mount 20.

More specifically, the eighth pin 46c has an outer diameter, and the eighth aperture 46b is sized predeterminedly larger than the diameter of the eighth pin 46c to provide a predetermined radial clearance $C_r$, about 0.15 inches, around the eighth pin 46c. Upon a failure of either the first or second links 26 and 34 to carry in-plane loads from the frame 22 to the platform 24, the eighth pin 46c directly contacts the failsafe link 42 at the eighth aperture 46b for carrying loads from the frame 22 through the failsafe link 42 to the platform 24 solely along a longitudinal axis 42a of the failsafe link 42, extending between the seventh and eighth joints 44 and 46, in tension or compression. The failsafe link 42 provides an alternate load path for supporting the frame 22 solely upon failure of the first or second links 26 and 34.

As used herein, failure means either wear, or plastic deformation, or fracture of the first or second links 26 and 34 or of any single load bearing joint thereof, i.e. the first through fifth joints 28 through 38, respectively, thereof which is sufficient to allow the eighth pin 46c to contact the failsafe link 42 at the eighth aperture 46b, and thereby provide an alternate load path from the frame 22 to the platform 24. This may occur by excessive movement of the frame clevises 22a and 22b relative to the platform 24 beyond a predetermined amount of clearances, i.e. radial clearance $C_r$.

In the event of failure of the second link 34, the first link 26 remains effective for transmitting all in-plane loads whether by tension, compression, or bending of the first link 26, with the additional loads from the second link 34 being carried by the failsafe link 42 in either tension or compression along its longitudinal axis 42a. The aft mount 20 is, therefore, still effective for carrying all required in-plane loads while using a simple failsafe link 42 pivotally joined at two joints only, i.e. the seventh and eighth joints 44 and 46. In this way, a larger and heavier, non-rotating failsafe bracket which accommodates also bending loads is not required.

In the event of failure of the first link 26, the eighth pin 46c will also contact the eighth aperture 46b for providing an alternate load path from the frame 22 to the platform 24. However, since the failsafe link 42 is not effective for carrying in-plane off-axis linear engine side loads $L_h$, the second link 34 must be effective for carrying such off-axis linear engine side loads in order for the aft mount 20 to carry roll loads in accordance with a preferred embodiment of the present invention.

More specifically, and referring again to FIGS. 3 and 3a as applied to the sixth clevis pin joint 40, the transverse clearance $C_t$ between the sixth aperture and pin 40b and 40c is provided also so that upon failure of the first link 26, the second link 34 indirectly contacts the sixth pin 40c at the sixth aperture 40b through a second set of second outer and inner bushings 62a and 64a respectively for preventing rotation of the second link 34 between the frame 22 and the platform 24 due to such off-axis engine side loads $L_h$. As described above, the transverse clearance $C_t$ between the first set of outer and inner bushings 62 and 64 respectively (which surround the third pin 32c within the third aperture 32b of the first link 26) is substantially zero to allow bending loads to be transmitted through the first link 26. However, during normal operation of the mount 20, the transverse clearance $C_t$ between the second set of outer and inner bushings 62a and 64a respectively (which surround the sixth pin 40c within the sixth aperture 40b) is sufficiently large to prevent the transmission of any loads including bending loads through the sixth pin 40c to the second link 34, and for allowing radial expansion of the frame 22 without bending restraint by the second link 34. Solely upon failure of the first link 26 is it then desirable for the second link 34 to carry bending loads therethrough which will occur once the sixth pin 40c indirectly contacts the second link 34 at the sixth aperture 40b through the second set of outer and inner bushings 62a and 64a. The transverse clearances C between one set of outer flat contact surfaces 70 and the set of inner flat contact surfaces 68, as shown in FIG. 3a may be about 0.15 inches.

Failure of the first link 26 will allow both the sixth pin 40c, indirectly, and the eighth pin 46c, directly, to contact the second link 34 and the failsafe link 42 at the sixth aperture 40b and the eighth aperture 46b, respectively. Rotation of the second link 34 about the fifth joint 38 is, therefore, prevented once the sixth pin 40c is in contact with the second link 34 at the sixth aperture 40b. For example, and referring to FIG. 3, one type of failure of the first link 26 will allow a vertical load $L_v$, such as a portion of the weight of engine 10 to act on the frame third clevis 22c which will cause the eighth pin 46c to drop and contact the bottom of the eighth aperture 46b as shown in phantom line designated 46A. Upon application of a left horizontal load $L_h$ on the frame third clevis 22c, also designated in phantom line, the eighth pin 46c will move horizontally to the left in FIG. 3 with corresponding rotation of the failsafe link 42 to slightly rotate the second link 34 clockwise about the fifth joint 38 until the sixth pin 40c indirectly contacts the right side surface of the sixth aperture 40b, designated in phantom line as 40A. Further movement or clockwise rotation, of the second link 34 about the fifth joint 38 is therefore prevented resulting in bending loads being transmitted through the second link 34. In this way, the second link 34, upon failure of the first link 26, provides 3-joint restraint and is effective for transmitting in-plane loads including vertical and horizontal loads, and, together with the failsafe link 42, roll moments are also transmitted in a manner similar to that of the 3-joint first link 26 prior to failure. If the application of the horizontal load $L_h$ is in an opposite direction, to the right as shown in FIG. 3, the sixth pin 40c will, instead, indirectly contact the left side of the sixth aperture 40b and again be effective for transmitting in-plane loads including vertical and horizontal.

Prior to failure of the first link 26, the second link 34 acts as a simple link supported at solely the two joints 36 and 38 for carrying loads solely along its longitudinal axis 34a in either tension or compression. However, upon failure of the first link 26, the second link 34 acts as a link fixedly secured at the three joints 36, 38 and 40 for transmitting in-plane loads including vertical and horizontal, and is therefore subject to bending in a fashion similar to that of the first link 26 prior to failure thereof. Accordingly, the second link 34 is a waiting link since it normally acts as a 2-joint link and awaits failure of the first link 26 before acting as a 3-joint link for transmitting bending loads. In normal operation, the second link 34 continues to function as a simple link and, therefore, retains simplicity of structure and allows for a compact arrangement of the first and second links 26 and 34 and the failsafe link 42 within a limited envelope.

Referring again to FIGS. 4 and 5, the first link 26 is preferably straight and the first, second, and third joints 28, 30, and 32 are generally colinearly aligned. The first and third joints 28 and 32 are spaced longitudinally apart on centers at a first distance $D_1$, and the second and third joints 30 and 32 are longitudinally spaced apart on centers at a second distance $D_2$, with the second distance $D_2$ being preferably greater than the first distance $D_1$.

Figure 5:
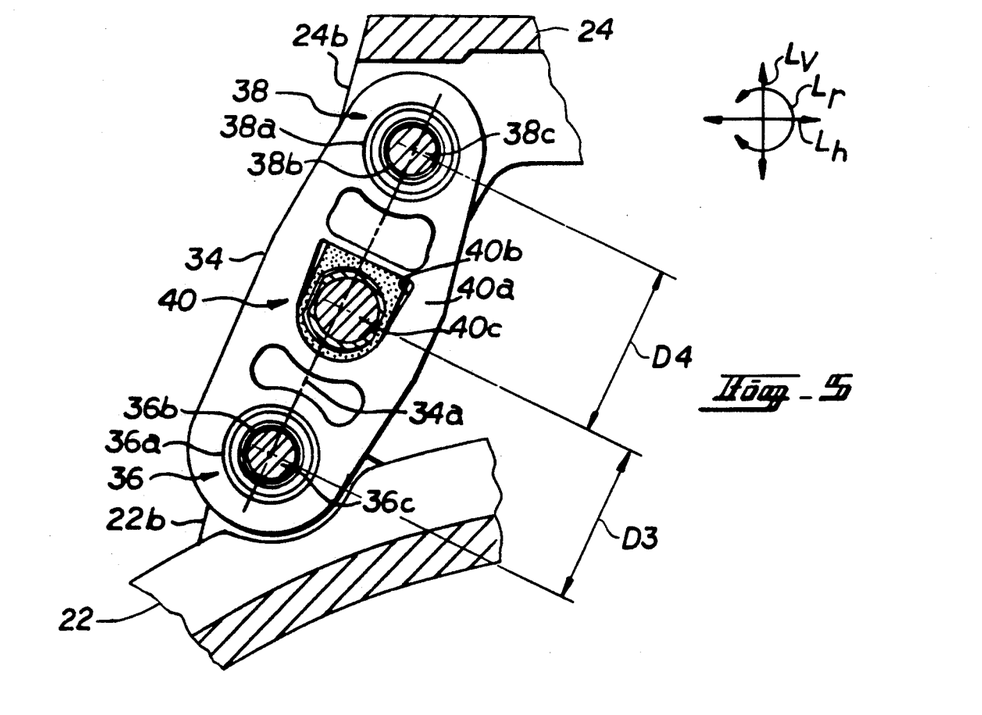
FIG. 5 is an enlarged elevation view of a second link used in the aft mount illustrated in FIG. 3.

Similarly, the second link 34 is preferably straight and the fourth, fifth, and sixth joints 36, 38, and 40 are generally colinearly aligned. The fourth and sixth joints 36 and 40 are longitudinally spaced apart on centers at a third distance $D_3$, and the fifth and sixth joints 38 and 40 are longitudinally spaced apart on centers at a fourth distance $D_4$, with the fourth distance $D_4$ being preferably greater than the third distance $D_3$. The first and third distances $D_1$ and $D_3$ represent moment arms about which loads are applied from the frame 22 to the platform 24 through the respective first and second links 26 and 34. The second and fourth distances $D_2$ and $D_4$ are the reaction moment arms across which the applied loads are reacted through the platform first and second clevises 24a and 24b. By sizing the first and second distances $D_1$ and $D_3$ less than the respective second and third distances $D_2$ and $D_4$, the shear loads acting through the second and fifth pins 30c and 38c due to the respective reaction couples or moments are reduced compared to the applied loads. If the distances $D_1$ and $D_3$ were greater than the distances $D_2$ and $D_4$, respectively, amplification of the applied loads would occur resulting in larger shear loads at the pins. By reducing the reaction loads in the second and fifth pins 30c and 38c, the shear stresses in the second, third, fifth and sixth pins 30c, 32c, 38c, 40c are reduced which improves the life of the mount 20 and allows for the components thereof to be made correspondingly smaller and more compact if desired. The straight first and second links 26 and 34 may be placed closer to the failsafe link 42 for also providing a more compact mount.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

We claim:

1. A mounting pin assembly for supporting a gas turbine engine to an aircraft pylon, said mounting pin assembly comprising:
   a generally annular outer bushing having an oppositely disposed set of axially extending outer flats having longitudinally extending widths on the inside diameter of said outer bushing, said outer bushing having an anti-rotation means to prevent said outer bushing from rotating within an aperture in a structural member used to mount the engine to the pylon;
   a generally annular inner bushing disposed within said outer bushing and having an oppositely disposed set of axially extending inner flats having longitudinally extending widths on the outside diameter of said inner bushing,
   an axially extending cylindrical mounting pin disposed within said inner bushing, and
   said inner bushing and outer bushing sized for allowing displacement of said mounting pin in a direction normal to the axis of said mounting pin and parallel to said outer flats, wherein each of said outer flats of said outer bushing comprises a planer surface formed on the inside diameter of said outer bushing and each of said inner flats of said inner bushing faces a corresponding one of said planer surfaces.

2. A mounting pin assembly according to claim 1, wherein said bushings are further sized for preventing displacement of said mounting pin in a direction normal to the axis of said mounting pin and normal to said outer flats.

3. A mounting pin assembly according to claim 2, wherein said anti7rotation means comprises an anti-rotation head on said outer bushing received within and operable to engage a recess in said structural member around said aperture to prevent rotation of said outer bushing, wherein said anti-rotation head is formed on an end of said outer bushing and wherein said anti7rotation head is unsymmetrical with respect to a circular cross-section of said aperture.

4. A mounting pin assembly for supporting a gas turbine engine to an aircraft pylon, said mounting pin assembly comprising:
   a generally annular outer bushing having an oppositely disposed set of axially extending outer flats having longitudinally extending widths on the inside diameter of said outer bushing, said outer bushing having an anti-rotation means to prevent said outer bushing from rotating within an aperture in a structural member used to mount the engine to the pylon;
   a generally annular inner bushing disposed within said outer bushing and having an oppositely disposed set of axially extending inner flats having longitudinally extending widths on the outside diameter of said inner bushing,
   an axially extending cylindrical mounting pin disposed within said inner bushing, and
   said inner bushing and outer bushing sized for allowing displacement of said mounting pin in a direction normal to the axis of said mounting pin and parallel to said outer flats; and
   a longitudinal clearance between said outer diameter of said inner bushing and said inside diameter of said outer bushing wherein said longitudinal clearance is sized for allowing displacement of said mounting pin in a direction normal to the axis of said mounting pin and parallel to said outer flats.

5. A mount for supporting a gas turbine engine to an aircraft pylon comprising:
   a frame fixedly joined in the gas turbine engine;
   a platform fixedly joined to the pylon;
   a first link pivotally joined to said frame at a first joint and pivotally joined to said platform at a second joint, and joined additionally to said platform at a clevis and pin type third joint, said joint including a cylindrical third pin having an axis and axially extending between said platform and said first link and through a third aperture in one of said first link and said platform;
   a generally annular fist outer bushing having an oppositely disposed set of axially extending first outer flats on the inside diameter of said first outer bushing, said first outer bushing disposed within said third aperture;
   a generally annular first inner bushing disposed within said first outer bushing and having an oppositely disposed set of axially extending first inner flats on the outside diameter of said first inner bushing and having said third pin disposed within said first inner bushing;
   said first inner bushing and said first outer bushing and corresponding respective first flats sized for allowing displacement of said third pin in a direction normal to the axis of said third pin and parallel to said first outer flats while preventing displacement of said third pin in said third aperture in a direction normal to the axis of said third pin and normal to said first outer flats and for preventing a corresponding rotation of said first link thus subjecting said third pin to a side load in a direction which is generally normal to the axis of said third pin and generally normal to said first outer flats;
   a second link spaced from said first link and pivotally joined to said frame at a fourth joint and pivotally joined to said platform at a fifth joint, and joined additionally to said platform at a sixth clevis and pin type joint including a sixth pin extending between said platform and said second link and through a sixth aperture in one of said second link and said platform;
   a generally annular second outer bushing having an oppositely disposed set of axially extending second outer flats on the inside diameter of said second outer bushing, said second outer bushing disposed within said sixth aperture;
   a generally annular second inner bushing disposed within said second outer bushing and having an oppositely disposed set of axially extending second inner flats on the outside diameter of said second inner bushing and having said sixth pin disposed within said second inner bushing; and
   said second inner bushing and said second outer bushing and corresponding respective second flats sized for allowing displacement of said sixth pin in said sixth aperture in both a first direction normal to an axis of said sixth pin and parallel to said second outer flats and a second direction normal to the axis of said sixth pin and normal to said second outer flats and for allowing limited rotation of said second link.

6. An aircraft engine mounting according to claim 5 further including a third failsafe link pivotally joined to said platform at a seventh joint, and joined to said frame at an eighth joint including an eighth pin extending between said frame and said third link and through an eighth aperture in one of said third link and said frame sized for allowing limited vertical and horizontal displacement of said eighth pin in said eighth aperture.

7. An aircraft engine mount according to claim 6 wherein:
   said third pin is fixedly joined to said platform and extends through said third aperture being disposed in said first link;
   said sixth pin is fixedly joined to said platform and extends through said sixth aperture being disposed in said second link; and
   said eighth pin is fixedly joined to said frame and extends through said eighth aperture being disposed in said third link.

8. An aircraft engine mount according to claim 7 wherein:
   said eighth pin has a diameter, and said eighth aperture is sized larger than said eighth pin diameter so that upon a failure of said first link to carry a load from said frame to said platform, said eighth pin contacts said third link at said eighth aperture for carrying said load from said frame to said platform through said third link; and
   said second inner flats of said second inner bushing are sized narrower than said second outer flats of said second outer bushing so as to provide a limited transverse clearance therebetween so that upon said first link failure said second link indirectly contacts said sixth pin through said inner and outer bushing respectively at said sixth aperture for preventing rotation of said second link between said platform and said frame due to said load.

9. An aircraft engine mount according to claim 8 wherein each of said first, second, fourth, and fifth joints includes:
   a spherical bearing joined to respective ones of said first and second links, and including a central aperture; and
   a pin extending through said spherical bearing and fixedly joined to respective ones of said platform and said frame.

* * * * *